United States Patent Office 3,142,692
Patented July 28, 1964

3,142,692
PREPARATION OF β-KETO ESTERS
Cataldo A. Maggiulli and Howard E. Munro, Rochester, N.Y., assignors to Eastman Kodak Company, Rochester, N.Y., a corporation of New Jersey
No Drawing. Filed Mar. 29, 1961, Ser. No. 99,027
12 Claims. (Cl. 260—405)

This invention relates to a method for preparing chemical compounds, and more particularly to an improved method for preparing β-keto esters.

The method of the invention provides an improvement in the preparation of β-keto esters of the type,

RCOCHR'COOR"

wherein R is a monovalent organic radical such as alkyl, aryl, alicyclic, etc., R' is hydrogen or acetyl, and R" is ethyl or methyl. Various esters of this type are known and have important utility as chemical intermediates, solvents, lubricants, etc. For instance, compounds prepared by our method are useful as intermediates in the preparation of photographic emulsion couplers, as disclosed in the patent application of Weissberger and Kibler, S.N. 25,295, filed April 28, 1960.

We have now developed a novel method for preparing such β-keto esters wherein magnesium metal, methyl or ethyl alcohol and ethyl or methyl acetoacetate are reacted in a selected solvent to form an alkoxymagnesium acetoacetate. The alkoxymagnesium acetoacetate is reacted with an acyl halide. The reaction product is thereafter subjected to hydrolysis to remove magnesium therefrom and obtain an ester of the type,

RCOCH(COCH₃)COOR"

In one embodiment of the method, the latter is further hydrolyzed to split off the acetyl group and obtain an ester of the type, RCOCH₂COOR".

The following equations represent the series of reactions, with methanol and ethyl acetoacetate as starting materials:

(1) CH₃OH+Mg+CH₃COCH₂COOC₂H₅
 →CH₃COCH(MgOCH₃)COOC₂H₅

(2) CH₃COCH(MgOCH₃)COOC₂H₅+RCOCl
 →RCOC(COCH₃)(MgCl)COOC₂H₅

(3)
RCOC(COCH₃)(MgCl)COOC₂H₅ —H⁺→
 RCOCH(COCH₃)COOC₂H₅

Heretofore, β-keto esters of the types indicated have been prepared by reacting an acyl chloride with the sodium salt of ethyl acetoacetate. However, when an acyl chloride is reacted with ethyl sodium acetoacetate the acyl radical attaches to the keto oxygen as well as to the carbon. An advantage of our method is that we obtain improved yields of the carbon addition product.

Furthermore, in the prior method the ethyl sodium acetoacetate is insoluble in the solvents employed and separates as a thick slurry, which is unfavorable for complete reaction. By the use of magnesium instead of sodium and the use of selected reaction solvents, we maintain all of the reactants in solution. This aids in achieving complete reaction, satisfactory reaction rate and easy control. Another advantage of our method is that by employing magnesium we avoid the fire hazards of the prior art use of sodium or sodium hydrides.

The alcohols employed for reaction with magnesium in our method can be methanol or ethanol. It is essential that the alcohol be anhydrous. Since ethanol is hygroscopic, it is difficult to maintain the ethanol anhydrous and therefore methanol is the preferred alcohol. Alcohols other than methanol and ethanol are unsatisfactory either because they do not react completely with the magnesium and the ethyl or methyl acetoacetate or they form a reaction product that precipitates from the reaction solvent.

The solvents used in our method are tetrahydrofuran and dioxane. Other solvents are unsatisfactory for various reasons. For instance, trimethylene and ethylene oxides are too reactive for use as solvents in our method. Ethyl and isopropyl ether are unsatisfactory because the intermediate magnesium compounds are insoluble in them. This make handling difficult and the reaction sluggish.

The method of our invention provides an improvement in the type of reaction in which an acyl group is substituted for hydrogen on the α-carbon atom of an acetoacetic acid ester to form a β-keto ester of the formula, RCHR'COOR", wherein R is an acyl radical, R' is hydrogen or acetyl and R" is ethyl or methyl. The method applies in general to any such acyl groups that are susceptible to substitution on such an ester. The acyl halides used in the process can be represented by the formula, RCOX, wherein X is any halogen and R is any monovalent organic radical of the types present in acyl halides and free of substituents that would interfere with the acylation reaction, including such radicals as alkyl, aryl, alkaryl, alicyclic, heterocyclic and the like. Chlorides are the preferred acyl halides because they are less expensive and more readily available than the other halides. However, acyl bromides, iodides and fluorides can be used.

The method of the invention is applicable to the acylation of either ethyl or methyl acetoacetate. With either of these acetoacetic acid ester starting materials, our method provides important advantages over prior methods of substituting an acyl radical for hydrogen on the α-carbon atom. However, the methyl methoxymagnesium acetoacetate obtained as an intermediate when methyl acetoacetate is the starting material is less soluble in tetrahydrofuran than ethyl methoxymagnesium acetoacetate and the yields of the desired β-keto esters are lower than are obtained with ethyl acetoacetate as the starting material. Accordingly, in the preferred embodiment of our method the ethyl ester of acetoacetic acid is employed.

As indicated in the reaction equations, the magnesium, the alcohol, the acetoacetic acid ester and the acyl halide react in equimolar proportions. Therefore, the method of the invention can be carried out by employing approximately equimolar ratios of these reactants. With the exception of the alcohol, small variations in the proportions of reactants, e.g. 10% more or less than equimolar proportions, can be used without significant differences in the results. However, we have found that a considerably more rapid reaction rate can be obtained by employing a substantial excess of the alcohol. In preferred embodiments of the process we employ as much as 30 mols or more of alcohol per mol of magnesium and of acetoacetate and thus obtain rapid reaction rate.

The amount of reaction solvent, i.e., tetrahydrofuran or dioxane, must be sufficient to provide an adequately fluid reaction mixture. For instance, an amount of solvent about double the volume of ethyl or methyl acetoacetate employed can be used. With a lesser amount of solvent, the mixture is too viscous for a good reaction. Preferably the amount of solvent is several times the amount of acetoacetate, for example, 5 to 10 times greater than the volume of acetoacetate.

To obtain a controllable, but sufficiently rapid, reaction we have developed a step-wise procedure for the preferred embodiment of our method. In this embodiment the magnesium metal is placed in the reaction vessel with a minor part of the alcohol to be employed in the reaction. We also add at this time a small amount of a material that activates or promotes the reaction of the magnesium and alcohol. Suitable activators are halogen-containing materials such as carbon tetrachloride, chloroform, iodine, bromine, methyliodide, ethylchloride, ethylene chloride and the like. A small amount of such material, e.g., 1 to 20 weight percent based on the magnesium, will initiate the reaction in a few minutes. The halogen-containing activator does not act as a solvent but apparently reacts with the surface of the magnesium to form a small film of a complex which is very reactive with the alcohol. The reaction will take place without an activator but then requires a long induction period. Therefore, the preferred embodiment of our method employs such an activator in the initial stage.

The initial reaction mixture consisting of the magnesium metal, a portion of the alcohol and the halogen-containing activator is heated slightly to initiate the reaction. Then a mixture consisting of the rest of the alcohol, the inert reaction solvent and the acetoacetate is added. This reaction mixture is refluxed until all of the magnesium is consumed, which may require a few minutes or several hours.

After completion of the first reaction stage during which the alkoxymagnesium acetoacetate is formed, the reaction mixture is distilled to remove the solvent. It is important to remove all of the alcohol at this point before introducing the acyl halide. A fresh amount of the inert reaction solvent is then added to the distillation residue to redissolve the alkoxymagnesium acetoacetate and the acyl halide is added to form the second-stage reaction mixture. The second-stage reaction mixture is maintained at reflux temperature for a sufficient time to complete the acylation reaction, wherein an acyl group is substituted for hydrogen on the α-carbon atom of the acetoacetate.

After completion of the second-stage or acylation reaction, the resulting acylated acetoacetate magnesium halide is hydrolyzed to remove the magnesium halide from the organic portion of the molecule and yield the desired β-keto ester. With most reactants with which the method of the invention is used, the hydrolysis is accomplished by acidifying the second-stage or acylation reaction product with a dilute aqueous mineral acid. However, with the product obtained by acylating with an acyl halide of which R is a highly branched aliphatic radical, e.g., trimethylacetyl halide, the hydrolytic splitting off of the magnesium halide can be accomplished by treatment with either a dilute mineral acid or with a base such as ammonium hydroxide. In this case the ammonium hydroxide treatment is preferred because of simplicity of handling.

As we have indicated, in one modification of the method, the ester product is further hydrolyzed to split off the acetyl group and yield an ester of the type,

RCOCH$_2$COOR''

In most instances this is accomplished by treating the ester with a base such as ammonium hydroxide. However, in the case of the ester prepared from a highly branched acyl halide such as trimethylacetyl halide, both the acetyl group and the magnesium halide can be split off by hydrolysis at the same time by treating the acylated acetoacetate magnesium halide with ammonia or a dilute acid.

The following examples illustrate preparation of certain β-keto esters by specific embodiments of the method of the invention. The first example demonstrates the use of an acyl chloride in which the substituent R is an alicyclic radical.

EXAMPLE 1

*Ethyl β-Oxocyclohexanepropionate*

In a 5-l. flask fitted with stirrer and reflux condenser are placed 55 g. of magnesium metal and 5 cc. of carbon tetrachloride. The flask is warmed slightly, the carbon tetrachloride is partly vaporized, then 200 cc. of methanol is added. A vigorous reaction should be well started before the next addition. A solution consisting of 1250 cc. of methanol, 1500 cc. of tetrahydrofuran and 285 g. of ethyl acetoacetate is added over a 0.5 hr. period and is refluxed for 4–5 hours or until all of the magnesium dissolves. All of the solvent is then removed under vacuum on a steam pot. The residue is heated to reflux temperature with 1500 cc. of fresh tetrahydrofuran until all of the ethyl methoxymagnesium acetoacetate is redissolved. The heat is shut off and 300 g. of cyclohexanoyl chloride is added over a period of 0.5 hr. and refluxed for an additional one hour. Then about one-half of the solvent is distilled at normal pressure, the residue cooled to 30–35° C. and poured into 5 kg. of ice containing 250 cc. of concentrated hydrochloric acid. The product layer is separated and the water portion is extracted with three 700-cc. portions of ethyl ether. The product layer and the ether extracts are combined to form a combined ether solution which is washed with 5% aqueous sodium bicarbonate solution and then washed with water. The ether solution is treated with a solution consisting of 1500 cc. of concentrated ammonium hydroxide (d.=0.90) and 500 cc. of water and stirred for 2 hours at 28° C. The ammonium hydroxide layer is separated and discarded. The ether layer is treated with 200 cc. of concentrated hydrochloric acid diluted with 1 liter of water and stirred for one hour. The ether layer is washed with 5% sodium bicarbonate and then with water. The product is distilled at 133–134° C./10 mm. giving 235 g. of ethyl β-oxocyclohexanepropionate, which is 62% of the theoretical amount.

The next example demonstrates the use of an acyl halide of which the substituent R is a highly branched aliphatic radical.

EXAMPLE 2

*Ethyl 4,4-Dimethyl-3-Oxovalerate*

In a 12-l. flask fitted with stirrer, reflux condenser and thermometer well are placed 108 g. (4.5 moles) of magnesium turnings and 7–10 ml. of carbon tetrachloride. The flask is warmed slightly until the carbon tetrachloride is partly vaporized, then 200 ml. of methanol is added. A vigorous reaction should be well started before the next addition. A solution consisting of 2800 ml. of methanol, 3000 ml. of tetrahydrofuran and 600 g. (4.6 moles) of ethyl acetoacetate is added during about 30 minutes. Refluxing is continued for 4–5 hours or until all of the magnesium dissolves. All of the solvent is removed under vacuum on a steam pot. The residue is heated to reflux with 3000 ml. of fresh tetrahydrofuran, the heat is shut off and 480 g. (4 moles) of trimethylacetyl chloride (pivaloyl chloride) is added during 15–30 minutes. Refluxing is continued for one hour after all of the acid chloride is added and the color changes from a dark gray to a light yellow. Then about one-half of the solvent is distilled and the residue is cooled to 30–35° C. To it is added 1500 ml. of ethyl alcohol and then 3 l. of concentrated ammonium hydroxide (d.=0.90) and the mixture is stirred for 30 minutes at 38–40° C. The mixture becomes quite thick. Ice is added to cool it to about 10° C. and cold sulfuric acid is added until the mixture is slightly acid to litmus. The oil-water mixture is extracted with three one-liter portions of ligroine and the combined extracts are washed once with water. The ligroine solution is filtered to remove any haze that may be present, and the ligroine is removed under vacuum. The residue is distilled through a one-bubbler Othmer column. After a small forerun, the product boils at 83–85°/8 mm. The yield is 385 g. of ethyl 4,4-dimethyl-3-oxovalerate (60% of the theoretical amount).

The next example demonstrates the use of an acyl halide of which the substituent R is an aryl radical.

EXAMPLE 3

*Ethyl m-Nitrobenzoylacetoacetate*

In a 1-liter flask fitted with stirrer and reflux condenser are placed 10.8 g. of magnesium metal and 1 cc. of carbon tetrachloride. The flask is warmed slightly until the carbon tetrachloride is partly vaporized, then 40 cc. of methanol is added. A vigorous reaction should be well started before the next addition. A solution consisting of 210 cc. of methanol, 250 cc. of tetrahydrofuran and 57 g. of ethyl acetoacetate is added during about 30 minutes. Refluxing is continued for 4 to 5 hours or until all of the magnesium metal dissolves. All of the solvent is removed under vacuum on a steam pot. The residue is heated to reflux with 300 cc. of fresh tetrahydrofuran until the residue dissolves, the heat is shut off and 74 g. of m-nitrobenzoyl chloride is added. Refluxing is continued for an additional hour. Then about one-half of the solvent is distilled at normal pressure, the residue is cooled to 30–35° C. and poured into a beaker containing 50 cc. of hydrochloric acid and one kg. of ice. The product crystallizes, and is filtered and dried giving 108 g., which is 100% yield of ethyl m-nitrobenzoylacetoacetate melting 60–64° C.

The next example demonstrates the procedure of hydrolytically splitting off an acetyl group from an ester of the type prepared in Example 3.

EXAMPLE 4

*Ethyl m-Nitrobenzoylacetate*

In a 1-liter flask fitted with a stirrer are placed 108 g. of ethyl m-nitrobenzoylacetoacetate, 400 cc. of ethyl alcohol and 150 cc. of concentrated ammonium hydroxide (d.=0.90) and the mixture is stirred for one hour at 40° C. The solution is cooled to 10–15° C. by the addition of ice and acetic acid is added until the solution is acid to litmus paper. The product is filtered and washed well with water. This gives 46 g. of ethyl m-nitrobenzoylacetate melting at 75–77° C., which is 50% yield.

The next example demonstrates the use of an acyl chloride of which the substituent R is a long chain alkyl radical.

EXAMPLE 5

*Ethyl 2-Acetyl-3-Oxooctadecanoate*

The same procedure is used in making ethyl 2-acetyl-3-oxooctadecanoate as was used in Example 3, except that the acyl halide is palmitoyl chloride. The yield of ethyl 2-acetyl-3-oxooctadecanoate is 80–88%, melting point 27–29° C.

The next example demonstrates the procedure of hydrolytically splitting off an acetyl group from an ester of the type prepared in Example 5.

EXAMPLE 6

*Ethyl 3-Oxooctadecanoate*

In a 12-l. flask fitted with stirrer and reflux condenser is placed 500 g. of ethyl 2-acetyl-3-oxooctadecanoate in 2 l. of ethyl ether. To this is added 1400 cc. of concentrated ammonium hydroxide (d.=0.90) diluted with 400 cc. of water, and the mixture is stirred for 2 hours. The ammonia-water layer is separated and discarded. The ether layer is stirred for one hour with 2 l. of 5% hydrochloric acid, separated, treated with 5% sodium bicarbonate solution, then washed with water. The ether is distilled in vacuo, the residual oil is diluted with 1 liter of ethyl alcohol and cooled to 4° C. overnight. This gives 300 g. of ethyl 3-oxooctadecanoate melting 34–36° C., which is a 70% yield.

It will be noted that in each of the above examples we formed a reaction mixture comprising magnesium, alcohol, acetoacetate and the reaction solvent. In effect, we prepared magnesium alkoxide in situ for reaction with the acetoacetate. Some benefits of our new method can be achieved by preparing magnesium methoxide or ethoxide separately and then reacting the same with the acetoacetate. However, we achieve much better results by reacting the magnesium and the alcohol in the presence of the acetoacetate and the solvent as described in the examples and this is the preferred method of our invention. We achieve better yields of ester and the reaction is easier to control in this preferred procedure as compared with the procedure in which the magnesium alkoxide is prepared in advance.

Although the invention has been described in considerable detail with reference to certain preferred embodiments thereof, it will be understood that variations and modifications can be effected within the spirit and scope of the invention as described hereinabove and as defined in the appended claims.

We claim:

1. The method of preparing a β-keto ester of the formula, RCHR'COOR'', wherein R is an acyl radical of a monocarboxylic acid, R' is selected from the group consisting of hydrogen and the acetyl radical and R'' is selected from the group consisting of ethyl and methyl radicals which comprises forming a reaction mixture comprising metallic magnesium, an alcohol selected from the group consisting of methanol and ethanol, an ester selected from the group consisting of ethyl acetoacetate and methyl acetoacetate and a solvent selected from the group consisting of tetrahydrofuran and dioxane, acylating the resulting alkoxymagnesium acetoacetate on the α-carbon atom thereof by reaction with an acyl halide of the formula, RCOX, wherein X is halogen, R is the same as defined above and is free of substituents that would interfere with the acylation reaction, subjecting the resulting acylated acetoacetate magnesium halide to hydrolysis to remove magnesium halide therefrom and recovering said β-keto ester.

2. The method of preparing a β-keto ester of the formula, RCHR'COOC$_2$H$_5$, wherein R is an acyl radical of a monocarboxylic acid and R' is selected from the group consisting of hydrogen and the acetyl radical which comprises forming a reaction mixture comprising metallic magnesium, methanol, ethyl acetoacetate and a solvent selected from the group consisting of tetrahydrofuran and dioxane, acylating the resulting ethyl methoxymagnesium acetoacetate on the α-carbon atom thereof by reaction with an acyl chloride of the formula, RCOCl, wherein R is the same as defined above and is free of substituents that would interfere with the acylation reaction, subjecting the resulting acylated ethyl acetoacetate magnesium chloride to hydrolysis to remove magnesium chloride therefrom and recovering said β-keto ester.

3. The method of preparing a β-keto ester of the formula, RCOCHR'COOC$_2$H$_5$, wherein R is a monovalent radical selected from the group consisting of alkyl, aryl and alicyclic radicals and R' is selected from the group consisting of hydrogen and the acetyl radical, which comprises forming an initial reaction mixture comprising metallic magnesium, methanol and a small amount of a halogenic activator for the reaction of the magnesium with the methanol, adding to the initial reaction mixture a mixture of tetrahydrofuran, ethyl acetoacetate and methanol, the amounts of said magnesium metal and said ethyl acetoacetate in the total reaction mixture being approximately equimolar and the amount of methanol being substantially in excess of an equimolar amount, maintaining the reaction mixture at reflux temperature until all of the magnesium has reacted, distilling the methanol from the resulting product, adding additional tetrahydrofuran solvent to the distillation residue comprising ethyl methoxymagnesium acetoacetate, adding to the latter solution an acyl chloride of the formula, RCOCl, wherein R is as defined above and is free of substituents that would interfere with the acylation reaction, maintaining the mixture under acylation reaction conditions, recovering a product comprising acylated ethyl acetoacetate magnesium chloride, subjecting the latter to hydrolysis and recovering a product comprising said β-keto ester.

4. The method according to claim 3 in which said β-keto ester is of the formula, RCOCH(COCH$_3$)COOC$_2$H$_5$, and is subjected to a further hydrolysis to split off the acetyl group and obtain an ester of the formula,

RCOCH$_2$COOC$_2$H$_5$

5. The method of preparing a β-keto ester of the formula, RCOCHR'COOC$_2$H$_5$, wherein R is a monovalent radical selected from the group consisting of alkyl, aryl and alicyclic radicals and R' is selected from the group consisting of hydrogen and the acetyl radical, which comprises forming an initial reaction mixture comprising metallic magnesium, methanol and a small amount of carbon tetrachloride, warming the reaction mixture to initiate the reaction of the magnesium and methanol, adding a mixture of tetrahydrofuran, ethyl acetoacetate and methanol, the amounts of magnesium and ethyl acetoacetate added to the total reaction mixture being approximately equimolar and the amount of methanol being several times greater than equimolar, the amount of methanol added to the initial reaction mixture being a minor part of the total amount of methanol, maintaining the reaction mixture under reflux conditions until all of the magnesium has reacted, distilling the reaction product to remove unreacted methanol therefrom, adding additional tetrahydrofuran solvent to the distillation residue comprising ethyl methoxymagnesium acetoacetate, adding to the solution thus formed an acyl chloride of the formula RCOCl, wherein R is as defined above and is free of substituents that would interfere with the acylation reaction, maintaining the mixture under acylation reaction conditions, separating from the reaction product an aqueous component and a non-aqueous component, the latter comprising acylated ethyl magnesium chloride acetoacetate, subjecting the latter to hydrolysis and recovering a product comprising said β-keto ester.

6. The method according to claim 5 in which the component comprising said acylated ethyl magnesium chloride acetoacetate is acidified in a first hydrolysis treatment to obtain a β-keto ester of the formula

RCOCH(COCH$_3$)COOC$_2$H$_5$ the latter is thereafter treated with ammonium hydroxide to split off the acetyl group by hydrolysis and an ester of the formula, RCOCH$_2$COOC$_2$H$_5$ is recovered.

7. The method according to claim 5 in which said acyl chloride is cyclohexanoyl chloride and the product recovered comprises ethyl β-oxocyclohexanepropionate.

8. The method according to claim 5 in which said acyl chloride is m-nitrobenzoyl chloride and the product recovered is ethyl m-nitrobenzoylacetoacetate.

9. The method according to claim 5 in which said acyl chloride is m-nitrobenzoyl chloride, the component comprising said acylated ethyl magnesium chloride acetoacetate is first acidified to recover a product comprising ethyl m-nitrobenzoylacetoacetate, the latter is subsequently treated with ammonium hydroxide and a product comprising ethyl m-nitrobenzoylacetate is recovered.

10. The method according to claim 5 in which said acyl chloride is palmitoyl chloride and the product recovered is ethyl 2-acetyl-3-oxooctadecanoate.

11. The method according to claim 5 in which said acyl chloride is palmitoyl chloride, the component comprising said acylated ethyl magnesium chloride acetoacetate is first acidified to recover a product comprising ethyl 2-acetyl-3-oxooctadecanoate, the latter is subsequently treated with ammonium hydroxide and a product comprising ethyl 3-oxooctadecanoate is recovered.

12. The method according to claim 5 in which said acyl chloride is trimethylacetyl chloride, the component comprising said acylated ethyl magnesium chloride acetoacetate is subjected to a single hydrolysis treatment comprising treatment with a substance selected from the group consisting of a dilute mineral acid and ammonium hydroxide, and a product of the single hydrolysis treatment comprising ethyl 4,4-dimethyl-3-oxovalerate is recovered.

References Cited in the file of this patent

UNITED STATES PATENTS

| 2,424,311 | Harris | July 22, 1947 |
| 2,438,241 | Wallingford et al. | Mar. 23, 1948 |
| 2,923,716 | Bossert | Feb. 2, 1960 |

FOREIGN PATENTS

| 302,750 | Great Britain | Dec. 27, 1928 |
| 868,832 | France | Jan. 17, 1942 |